July 18, 1933. R. T. KINTZING 1,918,973
MOTOR CONTROL SYSTEM
Filed April 4, 1930
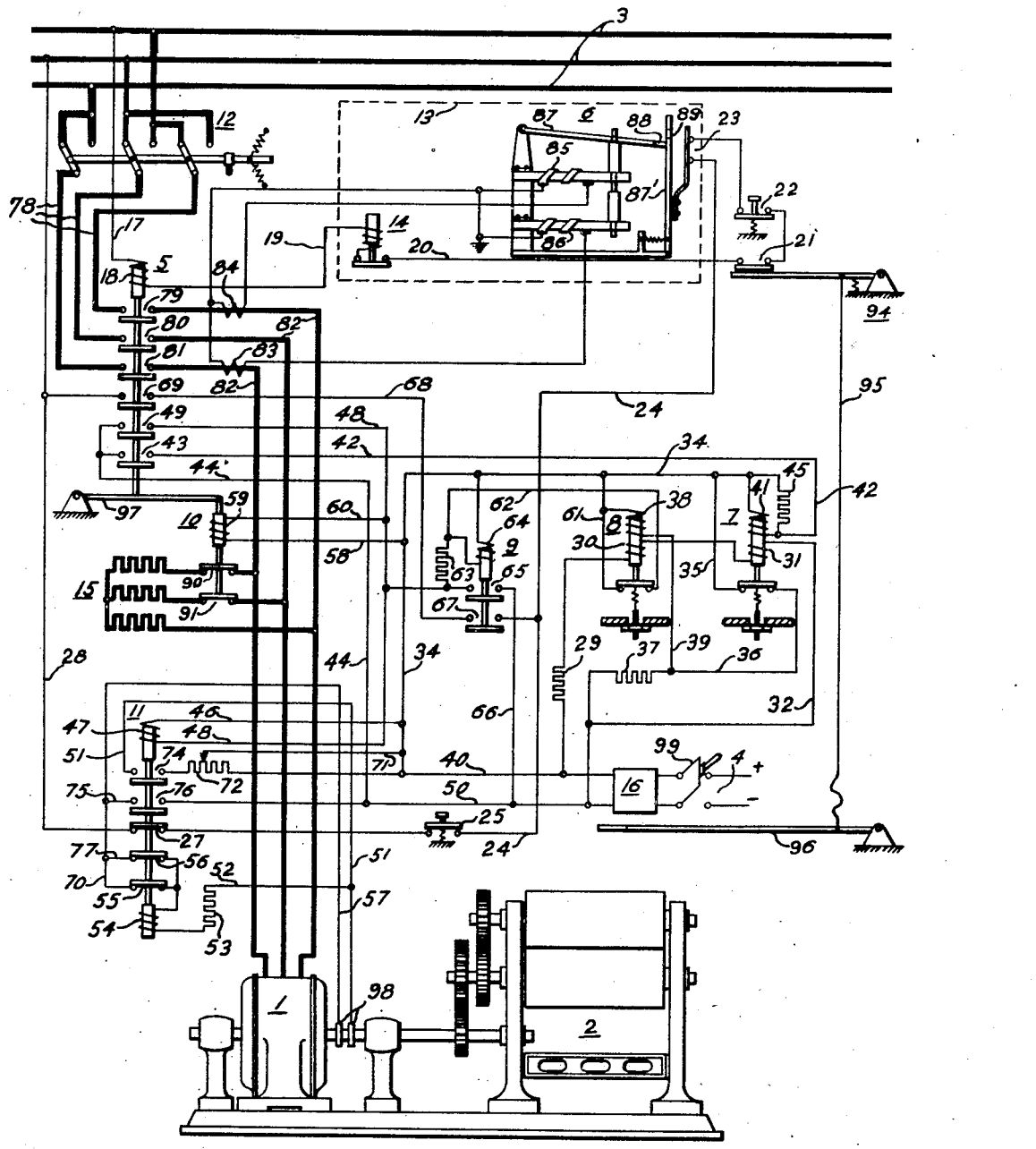
INVENTOR
Reese T. Kintzing
BY
Wesley J. Carr
ATTORNEY Patented July 18, 1933

1,918,973

UNITED STATES PATENT OFFICE

REESE T. KINTZING, OF WILKINSBURG, PENNSYLVANIA, ASSIGNOR TO WESTINGHOUSE ELECTRIC & MANUFACTURING COMPANY, A CORPORATION OF PENNSYLVANIA

MOTOR CONTROL SYSTEM

Application filed April 4, 1930. Serial No. 441,527.

My invention relates generally to control systems for synchronous motors and more particularly to control systems for synchronous motors utilized to drive rolling mills, grinding mills, rubber mills or similar machines.

When a synchronous motor is employed to drive a rubber mill or a plurality of rubber mills or similar machines, it is very desirable to stop the motor within a very short interval of time, especially in case of accident to an attendant, accident to the material, or when an overload on the motor occurs. The use of brakes and clutches to accomplish this result involves expensive equipment, high maintenance cost and unreliable service.

The object of my invention is to provide for electrically controlling the starting of a synchronous motor, and for electrically controlling the stopping of a synchronous motor and the machine driven thereby, by the establishment of a time-responsive dynamic-braking effect in the motor.

It is an important feature of this invention always to stop the motor dynamically whenever there is either a predetermined overload on it or there is a failure of voltage on the supply lines, or whenever the safety or emergency switch or the stop push-button is being operated.

Other objects of my invention are the provision of direct-current control circuits for establishing dynamic-braking circuits for a synchronous motor which are subject to the control of alternating-current control circuits, and the provision of control circuits for the establishment of dynamic-braking circuits which are effective immediately after the starting of the motor to stop it dynamically, regardless of whether or not it has attained synchronous speed.

The foregoing objects and advantages are attained by the present invention, and the various novel features, as well as other advantages and objects, will be apparent from a consideration of the description hereinafter given, especially when studied in conjunction with the accompanying drawing, the single figure of which is a diagrammatic view of a specific and preferred embodiment of the invention.

Referring more particularly to the drawing, 1 designates a synchronous motor wherein the armature constitutes the stator and the field windings are mounted on the rotor, the field windings being energized through slip rings from a suitable source 4 of direct current power.

The motor is mechanically coupled to a rubber mill 2. As shown, the armature or stator of the motor 1 is connected to conductors which may be supplied from any suitable source of alternating-current power such as the power system 3. A manually operable reversing switch 12 is connected in series-circuit relation to the conductors 78 and is spring biased to its open position. In the drawing, reversing switch 12 is shown in the left-hand position, in engagement with one set of contact members and it may be retained in that position in any well known manner. As illustrated, the line contactor 5 is connected in series-circuit relation to the conductors 78 and 82 and may be actuated to connect the motor armature to the power system 3.

The line contactor 5 is energized from the source of alternating-current power and is associated with a low-voltage protective device 14, an emergency switch 94 having the contacts 21, a stop push-button switch 22, a thermo-electric overload relay 6 and a starting push-button switch 25. It will be noted that the emergency switch 94 is spring biased to closed position and is connected, by a flexible member 95, to a lever 96 conveniently located for the attendant.

In case of accident to the material or to the attendant, it is merely necessary to strike lever 96, thereby disengaging the contact members 21 and, in consequence, stopping the motor by dynamic braking, within a very short and definite interval of time, as will be explained hereinafter. The starting push-button switch 25 is spring biased to its open position, whereas the stop push-button switch 22 is spring biased to its closed position.

The thermo-electric overload relay 6 comprises a supporting member and a pair of bimetallic strips heated by a pair of electric heaters 85 and 86. The heaters 85 and 86 are disposed to be energized from a pair of current transformers 83 and 84 associated with the power lines 82. If the motor 1 is subject to a predetermined overload for a predetermined interval of time, the pivotally mounted lever 87 is moved upwardly by the bimetallic strips, and the reduced end portion 88 of the lever 87 passes into the opening 89 of the vertically disposed pivotally mounted lever 87', thereby interrupting contacts 23 and causing the stopping of the motor 1, as will be pointed out more in detail hereinafter. The low-voltage relay and the thermo-electric overload relay are mounted in the housing 13, as indicated by broken lines.

Associated with the motor, is an independent source of direct-current power represented by the supply conductors 4 which may be utilized for exciting the field windings of the motor and also to supply the energy for a plurality of control circuits which function to establish a dynamic-braking circuit for the motor 1 upon the opening of the line contactor 5.

Within a housing 16, overload and low-voltage protective devices, similar to the devices 6 and 14 in the housing 13, are connected in series-circuit relation to the source of direct current, supply conductors 4, and the direct-current control circuits and the motor field windings. The protective devices in the housing 16, though accomplishing substantially the same result as devices 6 and 14, are, however, designed to be operated by direct current.

A resistor 15, connected in the manner of a star winding has one arm permanently connected to one of the conductors 82, whereas the other two arms are disposed to be connected to the remaining two of the conductors 82 through a pair of contact members 90 and 91 carried by the braking contactor 10. The braking contactor 10 is mechanically interlocked with the line contactor 5 by a pivotally mounted lever 97.

The relative magnetic strength of coils 18 and 59 is such that, when both of these coils are energized by normal voltage impressed upon them, the contact members associated with the contactor 5 will stand closed, while the contact members of the braking contactor 10 will stand open. From the foregoing, it will be apparent that the resistor 15 will be connected to the armature of the motor 1 to establish a dynamic-braking circuit only when the alternating current supply conductors 3 are disconnected from the armature.

To provide for the necessary field excitation during the establishment of the dynamic-braking circuit, a field contactor 11 is provided, and a pair of inductive time-limit relays 7 and 8 control the operation of a controlling relay 9, which, in turn, during dynamic braking, controls the operation of the field contactor 11.

The various devices schematically indicated in the drawing are shown in the positions they would occupy if neither the alternating-current control circuit nor the direct-current control circuits were energized.

If it is desired to start the motor, switch 99 is closed, thereby establishing a circuit from the positive line conductor 40, through resistor 29, neutralizing coil 30 of the time-limit relay 8, neutralizing coil 31 of the time-limit relay 7 and conductor 32, to the negative line conductor 50. A circuit is also established from the positive line conductor 40 through conductors 34 and 35, the contact members of the time relay 7, conductor 36 and resistor 37, to the negative line conductor 50. The circuit through conductor 35, the contact members of the time-limit relay 7 and conductor 36 constitute a shunt for the actuating coil 38 of the time-limit relay 8, and, in consequence, the contact members of time-limit relay 8 are not opened.

Upon depressing the starting push-button 25, a circuit is established from one of the conductors of the alternating-current supply lines 3, through conductor 17, actuating coil 18 of the line contactor 5, conductor 19, low-voltage protective device 14, conductor 20, contact members 21 of the emergency or safety switch 94, the stop push-button switch 22, the contact members 23 of the thermo-electric overload relay 6, conductor 24, starting push-button switch 25, back contact members 27 of the field contactor 11 and conductor 28, to a second conductor of the alternating-current supply lines 3. Energization of the coil 18 causes the closing of contact members 43, 49, 69, 79, 80 and 81, thereby establishing a circuit from the alternating-current supply lines 3, through the reversing switch 12, conductors 78, contact members 79, 80 and 81 and conductors 82, to the armature of the motor 1.

It will be noted that the current transformers 83, and 84 cannot be energized prior to the closing of the contact members 79, 80 and 81 and, in consequence, the thermo-electric overload relay 6 is energized only when current is supplied to the motor armature. By reason of the mechanical interlock between the line contactor 5 and the braking contactor 10, energization of the line contactor 5 causes the opening of the contact members 90 and 91, thereby preventing the possibility of supplying the dynamic-braking resistor 15 with energy from the source of alternating-current power.

Operation of the line contactor 5 and the consequent closing of the contact members 43 establishes a circuit from the positive conductor 40, through conductor 34, magnetizing coil 41 of the time-limit relay 7, conductor 42, contact members 43 and conductor 44, to the negative line conductor 50. Connected in parallel-circuit relation to the magnetizing coil 41, is a resistor 45 serving as a discharge circuit for the coil 41. Energization of the coil 41 causes immediate opening of the contact members of the time-limit relays 7, thereby interrupting the shunt circuit through conductors 35 and 36 of the magnetizing coil 38 of the time-limit relay 8.

Energization of the magnetizing coil 38 causes immediate opening of the contact members of the time-limit relay 8, thereby removing the circuit through the conductors 61 and 62 connected in parallel with the actuating coil 64 of the control relay 9. The actuating coil 64, being thus energized, closes the contact members 65 and 67. During the sequence of operation just discussed, the time-limit relays 7 and 8 and the control relay 9 have a very negligible time constant so that the contact members 65 and 67 close almost immediately after the operation of the line contactor 5.

Closing of the contact members 67 establishes a holding circuit for the magnetizing coil 18 of the line contactor 5. This circuit may be traced from the energized conductor 24, through contact members 67, conductor 68, contact members 69 and conductor 28, to one of the conductors of the power supply lines 3. The attendant thereupon may release the starting push-button switch 25, and the functions thereafter following take place automatically. Closing of the contact members 65 establishes a circuit from the positive conductor 40, conductor 34, actuating coil 64 of the control relay 9, resistor 63, contact members 65 and conductor 66 to the negative conductor 50. Attention is called to the fact that the actuating coil 64 is not entirely dependent, for its energization, on the closing of contact members 65, since, by the closing of contact members 49 of the line contactor 5, an energizing circuit for coil 64 was established which extends from the energized conductor 34, through coil 64, the resistor 63, conductor 48 contact members 49 and conductor 44, to the negative line conductor 50.

Closing of contact members 65 also establishes a circuit from the energized conductor 34, through conductor 58, actuating coil 59 of the braking contactor 10, conductors 60 and 48, contact members 65 and conductor 66, to the negative conductor 50. From the energized conductor 48, a circuit for the actuating coil 59 may also be traced, through the contact members 49 and conductor 44, to the negative conductor 50. Energization of the actuating coil 59, at this stage of operation, does not close the contact members 90 and 91, since the actuating coil 18 is energized and through the mechanical interlock 97, holds the contact members 90 and 91 in inactive positions. It is to be understood, however, that, upon deenergization of the actuating coil 18, the braking contactor 10 immediately closes contact members 90 and 91 and holds them in position, thereby preventing dangerous arcing and the consequent welding of these contact members during the opening of the line contactor.

Upon the operation of the control relay 9, a circuit is established for the actuating coil 47 of the field contactor 11. This circuit may be traced from the energized conductor 34, through conductor 46, actuating coil 47, conductor 48, contact members 65 and conductor 66, to the negative conductor 50. A circuit for the actuating coil 47 is also completed, through the contact members 49, to the negative conductor 50, as above explained in connection with the actuating coils 59 and 64.

It is a well known fact that a synchronous motor, during starting, functions like a transformer, thereby inducing a voltage of considerable value in the field windings. It is this voltage induced in the field windings that is being made use of to control the operation of the field contactor 11. The alternating current induced in the field windings of the motor 1 is impressed across the slip rings 98 and discharges through a circuit which may be traced from one of the slip rings 98, through conductors 51 and 52, resistor 53, restraining coil 54, contact members 55 and 56, conductors 70 and 77 and conductor 57, to the other of the slip rings 98.

Energization of the actuating coil 47, therefore, cannot operate to connect the field windings of the motor to the direct-current source of power as long as the synchronous motor has not come up to some predetermined percent of the synchronous speed. As the motor accelerates, the slip frequency, as well as the voltage induced in the field windings, decreases and, in consequence, the magnetic effect of the coil 54 becomes negligible, whereupon the contact members 74 and 76 are closed and then the contact members 56 are opened. The arrangement of contact members 55 and 56 and contact members 74 and 76 is such that the circuit of the field windings will not be interrupted. When the actuating coil 47 is deenergized, as will be explained more in detail hereinafter, the opening of contact members 74 and 76 again takes place after contacts 56 have closed.

Actuation of the field contactor 11, as just explained, establishes a direct-current excitation circuit for the field windings of the synchronous motor, through a conductor 71, a portion of the field rheostat 72, contact members 74, conductor 51, one of the slip rings 98, the field windings of the motor, the second of the slip rings 98, conductor 57, conductor 75 and contact members 76, to the negative conductor 50. The motor, under normal conditions of load, may now operate at synchronous speed. It will be noted that the operation of the field contactor 11 opens the contact members 27, thereby preventing inadvertent, careless or malicious interference with the dynamic stopping of the motor by depressing the starting push-button switch 25.

When it is desired to stop the motor, the stop push-button switch 22 may be depressed, or the emergency switch 94 may be operated by the lever 96, thereby interrupting the contact members 21. If the stop push-button switch 22 is depressed, the energizing circuit for the coil 18 is interrupted at switch 22 and, in consequence, the contact members 43, 49, 69, 79, 80 and 81 are opened. At the same time, since actuating coil 59 is still energized, the contact members 90 and 91 are firmly closed, thereby connecting the resistor to the motor armature to establish a dynamic-braking circuit. The opening of the contact members 49, however, does not interrupt the circuit for actuating coil 47 of the field contactor 11 or the actuating coil 64 of the control relay 9, or the circuit for the actuating coil 59 of the braking contactor 10, since contact members 65 are still closed. The opening of the contact members 43, however, does interrupt the circuit for the actuating coil 41 of the time-limit relay 7.

The actuating coil 41 discharges through the resistor 45, and, after a predetermined interval of time, determined by the spring adjustment of the time-limit relay 7 and the magnetic effect of the neutralizing coil 31, the contact members of the time-limit relay are actuated into engagement to thereby complete the shunt circuit through conductors 35 and 36 for the actuating coil 38 of the time-limit relay 8.

Deenergization of the magnetizing coil 38 of the time-limit relay 8 by the shunt circuit just described causes the closure of the contact members associated with this time-limit relay. However, the time required to close these contact members is predetermined by the spring adjustment and by the magnetic effect of the neutralizing coil 30. After the predetermined time elapses, the actuating coil 64 is deenergized by the establishment of a shunt circuit which extends, through the conductors 34 and 61, the contact members of time-limit relay 8 and conductor 62, to the upper junction of the resistor 63.

The deenergization of the actuating coil 64 and the consequent opening of the contact members 65 and 67, causes the deenergization of the actuating coils 47 of the field contactor 11, whereupon the excitation of the field windings of the motor from the direct-current source is discontinued by the opening of contact members 74 and 76. An instant prior to the opening of contact members 74 and 76, contact members 56 close and, immediately after the opening of contact members 74 and 76, contact members 55 close, thus preventing an open circuit for the field windings. However, during this stage of operation i. e. during the opening of the contact members of the field contactor 11, the timed operation of contact members 74 and 76, and 55 and 56 is not as important as during closing of the contact members of the field contactor 11, since no power is supplied to the armature of the motor, with the consequence that there is substantially no alternating current induced in the field windings which needs to be discharged through the resistor 53.

Attention is called to the important results that follow from the sequence of operation of the time-limit relays 7 and 8, the deenergization of the control relay 9 by these time-limit relays, and the consequent opening of the field contactor 11. In order to provide for effective dynamic braking of the motor, it is necessary that the field excitation be of normal or above normal strength for a period sufficiently long to allow the motor to come to rest. It is just this desirable result that the time-limit relays produce. When the time-limit relay 7 is deenergized, which takes place at the same instant that the alternating-current power is removed from the armature of the motor and the dynamic-braking circuit is established, a predetermined interval of time elapses before the time-limit relay 8 is deenergized, whereupon another predetermined interval of time elapses before the control relay 9 and the field contactor 11 are deenergized. From the foregoing, it is apparent that the field excitation for the motor 1 is maintained for a predetermined interval of time after the closing of contact members 90 and 91, thus providing a time-controlled dynamic-braking effect for the motor.

I do not wish to be restricted to the specific structural details, arrangement of parts or circuit connections herein set forth, as various other modifications thereof may be effected without departing from the spirit and scope of my invention. I desire, therefore, that only such limitations shall be imposed as are indicated in the appended claims.

I claim as my invention:

1. In a control system for synchronous motors, a source of alternating-current power, a synchronous motor, connecting means disposed to be energized by current from the alternating-current power source for connecting the motor to said power source, a field winding for said motor, a source of direct-current power, means connected to the direct-current power source for connecting the field windings to the source of direct-current power, a dynamic-braking circuit for said motor, means connected to the direct-current power source for establishing the dynamic-braking circuit for the motor upon deenergization of said connecting means, and means responsive after an interval of time for maintaining the connection of the field windings to the direct-current power source for a definite time after the operation of the means for establishing of the dynamic-braking circuit.

2. In a control system for alternating-current motors, a source of alternating-current power, an alternating-current motor, a line contactor for connecting the motor to the source of power, field windings for the motor, a second source of power, field-connecting means for connecting the field to the second source of power, a dynamic-braking circuit for the motor, electric means connected to the second source of power and mechanically interlocked with the line contactor for establishing the dynamic-braking circuit for the motor, and time-responsive means for retaining said field-connecting means in operated position for a definite time after the opening of the line contactor.

3. In a control system for a synchronous motor, a source of alternating-current power, a synchronous motor having field windings, a control circuit connected to the source of alternating-current power including a line contactor for connecting the motor to the source of alternating-current power, a source of direct-current power, means associated with the direct-current power source for connecting the field windings to the source of direct-current power, a dynamic-braking circuit, means for connecting the dynamic-braking circuit to the motor to stop the motor dynamically, and means for preventing the de-energization of the connecting means for the field windings for a definite time after the connection of the dynamic-braking circuit to the motor.

4. In a control system for alternating-current motors, a source of alternating-current power, a motor having field windings, an electromagnetic line contactor for connecting the motor to the source of power, a dynamic-braking circuit, an electromagnetic braking contactor for establishing a dynamic-braking circuit for the motor, said line contactor and braking contactor being mechanically interlocked whereby the dynamic-braking circuit may be established only upon the opening of the line contactor, electromagnetically operated means for energizing the field windings of the motor, time-limit relays for maintaining full excitation of the field windings for a predetermined interval of time upon the closing of the braking contactor, a field-discharge resistor, and means for connecting the discharge resistor to the field windings after the lapse of the predetermined interval of time.

5. In a control system for a synchronous motor, a source of alternating-current power, a synchronous motor, a control circuit connected for energization from the source of alternating-current power, a line contactor controlled by the energization of said control circuit for connecting the motor to said source of power, a source of direct-current power, a second control circuit connected for energization from the source of direct-current power, a dynamic-braking circuit, a braking contactor controlled by the energization of the second named control circuit for connecting the dynamic-braking circuit to the motor, a mechanical interlock connecting said contactors, the relative strength of the contactors being so chosen that the braking contactor, whether energized or not, is opened upon energization of the line contactor.

6. In a control system for a synchronous motor, a source of alternating current power, a synchronous motor having a field winding, a control circuit connected to the source of alternating-current power including, in series, a stop push-button, a safety switch, an overload protective device and a line contactor for connecting the motor to and disconnecting the motor from the source of alternating-current power, a source of direct-current power, automatic circuit controlling means for connecting said field winding to and disconnecting it from the source of direct-current power, said circuit controlling means being energized by said direct-current source, and means for producing a dynamic-braking effect in the motor upon the operation of either the safety switch, the stop push-button, or the overload protective device.

REESE T. KINTZING.